(12) United States Patent
Yoshida

(10) Patent No.: US 6,621,583 B1
(45) Date of Patent: *Sep. 16, 2003

(54) DISTANCE-MEASURING APPARATUS

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,263

(22) Filed: Jan. 19, 2000

(30) Foreign Application Priority Data

Jan. 20, 1999 (JP) ............................................ 11/012077

(51) Int. Cl.$^7$ .......................... G01B 11/14; G01C 3/08; G03B 13/00
(52) U.S. Cl. .................... 356/614; 356/3.04; 396/106; 396/120
(58) Field of Search ............................. 356/3.04–3.07, 356/4.03, 614; 250/559.38, 214 R, 214 LA, 201.1–201.5; 396/96, 98, 106, 120, 125

(56) References Cited

U.S. PATENT DOCUMENTS 5,659,387 A    8/1997  Yoshida ..................... 356/4.01
6,323,940 B1 * 11/2001 Yoshida ..................... 356/3.04

FOREIGN PATENT DOCUMENTS

JP        7-181038        7/1995

* cited by examiner

Primary Examiner—Frank G. Font
Assistant Examiner—Amanda Merlino
(74) Attorney, Agent, or Firm—Leydig, Voit & Mayer, Ltd.

(57) ABSTRACT

A distance-measuring apparatus includes a diode projecting pulses of light toward an object at a distance to be measured, a photoreceptor for receiving reflected pulses of light reflected from the object, an arithmetic unit outputting a ratio signal according to the distance, an integrator integrating the ratio signal by discharging an integrating capacitor to produce a first integral, charging the integrating capacitor with constant current to produce a second integral, a maximum second integral time selector for selecting a maximum of the second integration times, and a detector for determining the distance based on the signal output by the integrator after the lapse of the maximum second integration time.

7 Claims, 5 Drawing Sheets

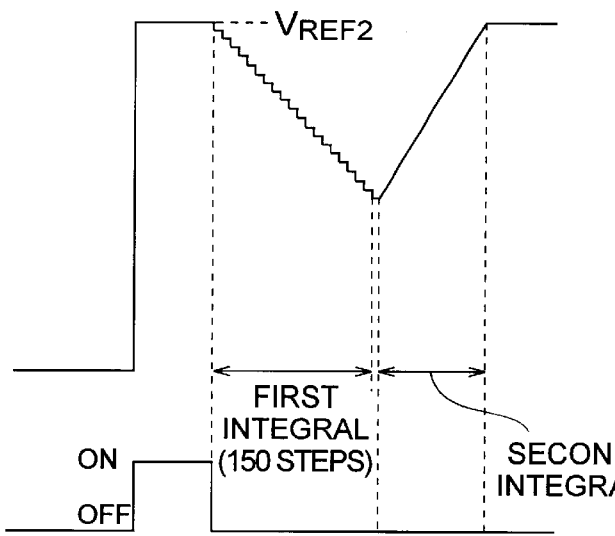
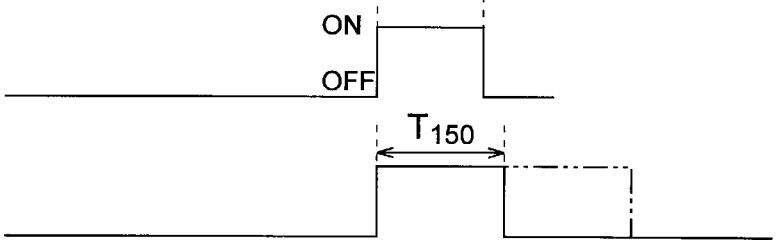
*Fig.4A*
*Fig.4B*
*Fig.4C*
*Fig.4D*

DISTANCE-MEASURING APPARATUS

BACKGROUND OF THE INVENTION

1. Field of the Invention

The present invention relates to a distance-measuring apparatus for measuring the distance to an object to be measured and, more particularly, to an active distance-measuring apparatus suitably used in cameras and other equipment.

2. Related Background Art

The active distance-measuring apparatus used in the cameras etc. is arranged to project light from an infrared-emitting diode (hereinafter referred to as "IRED") toward the measured object, to receive reflected light of the projected light by a position sensing device (hereinafter referred to as "PSD"), to process a signal from this PSD by a signal processing circuit and an arithmetic circuit to output distance information, and to determine the distance to the measured object by a CPU. Since the distance measurement with only one projection of light can cause an error, it is desirable that a plurality of light projection operations be carried out to gain a plurality of distance information pieces and that the plurality of distance information pieces be integrated in a fixed period by an integrating circuit to be averaged. The integral of distance information by the integrating circuit is carried out by applying a reference voltage to an integrating capacitor to store charge therein and discharging the capacitor according to the distance information from that state.

SUMMARY OF THE INVENTION

The distance-measuring apparatus described above, however, has the problem of long distance measurement time. For example, where the integral of distance information is carried out by charge and discharge of the integrating capacitor, the charge and discharge time varies with change in the number of emissions depending upon the distance measurement condition such as the luminance or the like. Therefore, in the step of distance measurement the charge and discharge time needs to be set to the maximum time when the charge and discharge time becomes maximum. This setting to the maximum time, however, requires a lapse of the maximum time equally as the charge and discharge time even in cases wherein the charge and discharge time is short. Therefore, it requires unnecessarily long measurement time.

Therefore, the present invention has been accomplished in order to solve this problem and an object of the present invention is to provide a distance-measuring apparatus that can measure the distance within a reduced measurement time.

A distance-measuring apparatus according to the present invention is a distance-measuring apparatus comprising: light projecting means for projecting pulses of light toward a measured object; light receiving means for receiving reflected light of the light projected toward the measured object, at a photoreceptive position on a position sensing device according to a distance to the measured object and outputting a signal according to the photoreceptive position; arithmetic means for carrying out an arithmetic operation based on the signal outputted from the light receiving means and outputting an output ratio signal according to the distance to the measured object; integrating means comprising an integrating capacitor, the integrating means carrying out a first integral in which the signal outputted from the arithmetic means is integrated by discharging/charging the integrating capacitor according to the signal outputted from the arithmetic means and thereafter carrying out a second integral by charging/discharging the integrating capacitor at a constant current, the integrating means comparing a voltage of the integrating capacitor with a reference voltage during the second integral and outputting a comparison result signal according to a result of the comparison; maximum second integral time selecting means for selecting one of a plurality of maximum second integral times, each being set as a process time of the second integral, according to a distance measurement condition; and detecting means for detecting the distance to the measured object, based on the signal outputted from the integrating means, after a lapse of the maximum second integral time.

The distance-measuring apparatus according to the present invention is also characterized in that the maximum second integral time selecting means selects the maximum second integral time according to the distance measurement condition of one of luminance, ambient temperature, and focal length.

According to the present invention, the maximum second integral time is properly set according to the distance measurement condition and the next operation is carried out after a lapse of the maximum second integral time. Therefore, the next operation can be carried out soon after completion of the second integral, thus reducing the distance measurement time.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4A to FIG. 4D are explanatory diagrams to illustrate the operation of the distance-measuring apparatus according to the present invention.

DESCRIPTION OF THE PREFERRED EMBODIMENTS

The embodiments of the present invention will be described in detail with reference to the accompanying drawings. The following description is based on the examples in which the active distance-measuring apparatus of the embodiments is applied to the distance-measuring apparatus of an autofocusing camera.

First Embodiment

Figure 1:
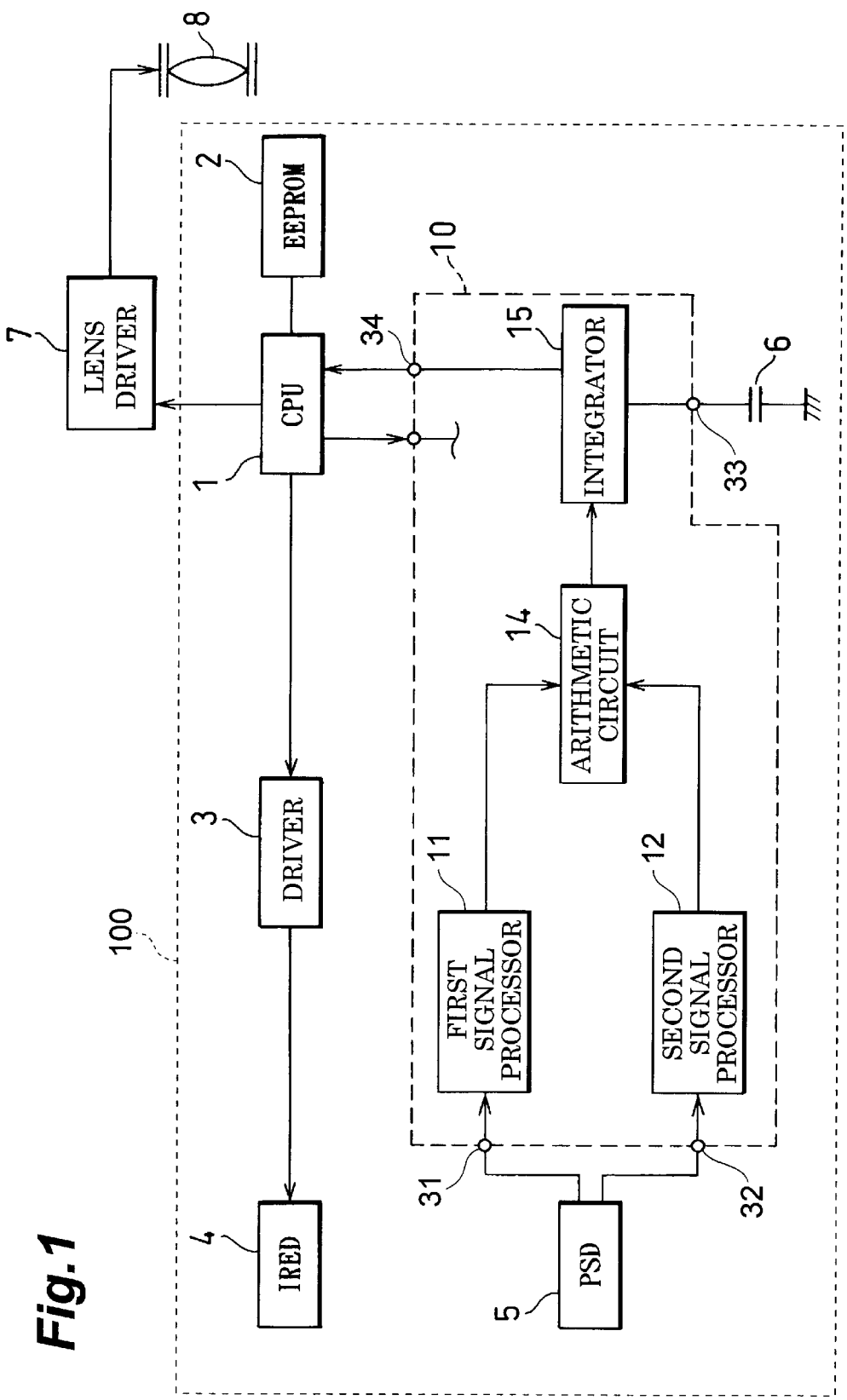
FIG. 1 is a structural diagram of a preferred embodiment of the distance-measuring apparatus according to the present invention.

FIG. 1 is a structural diagram of the distance-measuring apparatus 100 of the present embodiment. CPU 1 controls the whole of the camera equipped with this distance-measuring apparatus 100 and controls the whole camera including this distance-measuring apparatus 100, based on programs and parameters preliminarily stored in EEPROM 2. In this distance-measuring apparatus 100, the CPU 1 controls a driver 3 to control emission of infrared light from IRED (infrared-emitting diode) 4. The CPU 1 also controls the operation of autofocusing IC (hereinafter referred to as "AFIC") 10 and receives an AF signal outputted from the AFIC 10.

The infrared light emitted from the IRED 4 is projected through a projection lens (not illustrated) placed in front of the IRED 4, toward an object to be measured. The infrared light is reflected in part by the measured object and the reflected light is received somewhere on a photoreceptive surface of PSD 5 through a reception lens (not illustrated) placed in front of the PSD (position sensing device) 5. The light receiving position varies depending upon the distance to the measured object.

The PSD 5 outputs two signals $I_1$ and $I_2$ according to the reception position. The signal $I_1$ is a near-side signal which becomes greater with decrease of the distance to the measured object if optical energy of received light is constant. The signal $I_2$ is a far-side signal which becomes greater with increase of the distance to the measured object if optical energy of received light is constant. The sum of the signal $I_1$ and the signal $I_2$ represents optical energy of the reflected light received by the PSD 5. The near-side signal $I_1$ is sent to a PSDN terminal 31 of the AFIC 10 and the far-side signal $I_2$ to a PSDF terminal 32 of the AFIC 10. In practice, however, the AFIC 10 accepts signals in which a stationary light component $I_0$ is added to each of the near-side signal $I_1$ and the far-side signal $I_2$, depending upon external field conditions.

The AFIC 10 is an integrated circuit (IC) which is composed of a first signal processing circuit 11, a second signal processing circuit 12, an arithmetic circuit 14, and an integrating circuit 15. The first signal processing circuit 11 receives the signal $I_1+I_0$ outputted from the PSD 5 and removes the stationary light component $I_0$ from the signal to output the near-side signal $I_1$. The second signal processing circuit 12 receives the signal $I_1+I_0$ outputted from the PSD 5 and removes the stationary light component $I_0$ from the signal to output the far-side signal $I_2$.

The arithmetic circuit 14 receives the near-side signal $I_1$ outputted from the first signal processing circuit 11 and the far-side signal $I_2$ outputted from the second signal processing circuit 12 and computes an output ratio ($I_1/(I_1+I_2)$) to output an output ratio signal indicating the result of the computation. This output ratio ($I_1/(I_1+I_2)$) indicates the reception position on the photoreceptive surface of PSD 5, i.e., the distance to the measured object.

The integrating circuit 15 receives this output ratio signal and adds up a lot of output ratios in cooperation with an integrating capacitor 6 connected to a $C_{INT}$ terminal 33 of the AFIC 10, to improve an S/N ratio. The integral result of output ratios is outputted as an AF signal from an $S_{OUT}$ terminal 34 of the AFIC 10. The CPU 1 receives the AF signal outputted from the AFIC 10 and converts the AF signal to a distance signal by a predetermined arithmetic to send the distance signal to a lens driving circuit 7. The lens driving circuit 7 moves a taking lens 8 to an in-focus position, based on the distance signal.

Circuit configurations of the first signal processing circuit 11 and integrating circuit 15 of the AFIC 10 will be described in detail below.

Figure 2:
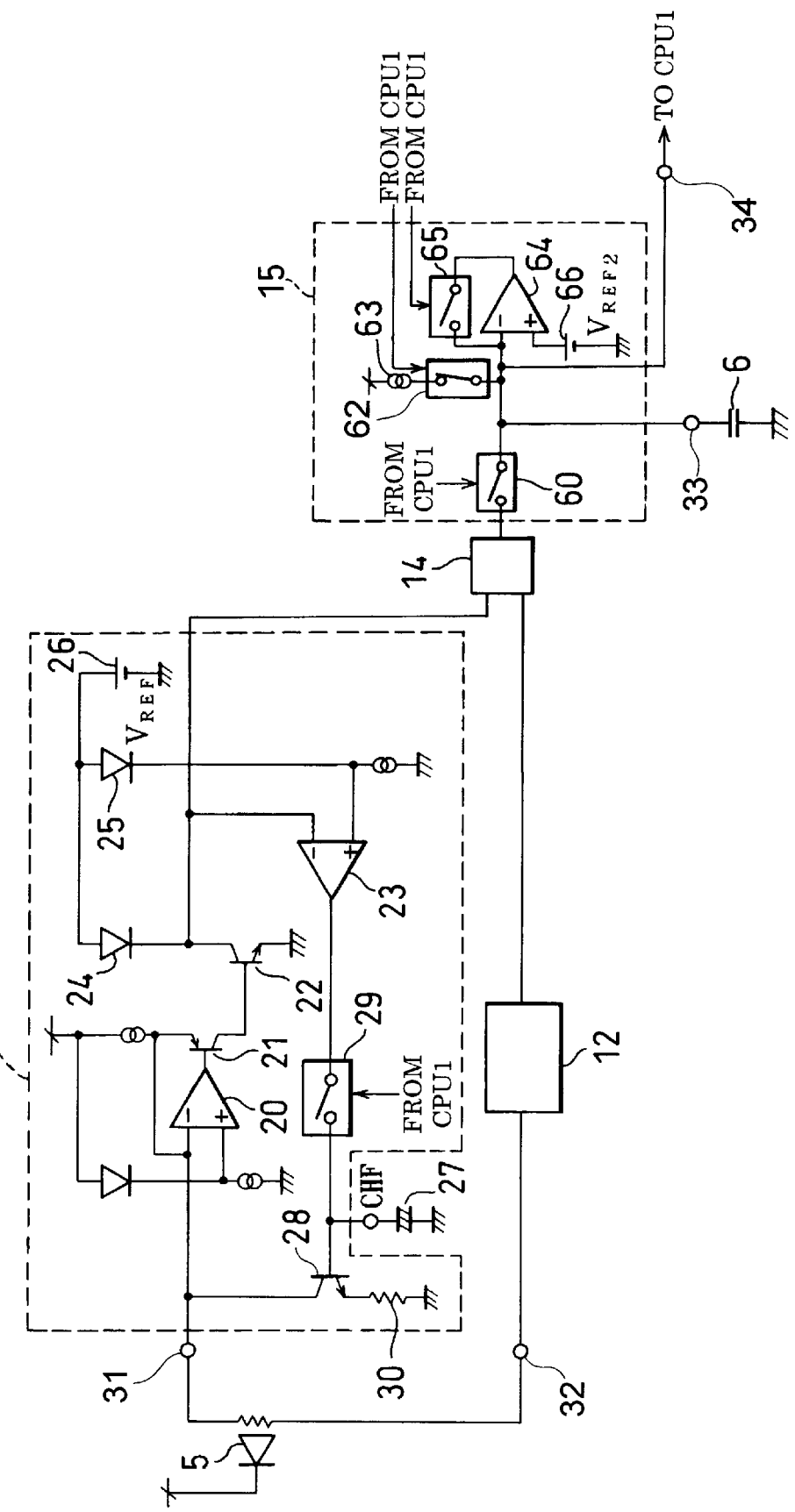
FIG. 2 is a circuit diagram of a first signal processing circuit and an integrating circuit in the distance-measuring apparatus illustrated in FIG. 1.

FIG. 2 is a circuit diagram of the first signal processing circuit 11 and the integrating circuit 15. The circuit configuration of the second signal processing circuit 12 is also similar to that of the first signal processing circuit 11. As described above, the first signal processing circuit 11 is the circuit which receives the near-side signal $I_1$ plus the stationary light component $I_0$ outputted from the PSD 5 and removes the stationary light component $I_0$ therefrom to output the near-side signal $I_1$. Namely, a near-side terminal of the PSD 5 is connected via the PSDN terminal 31 of the AFIC 10 to a negative input terminal of an operational amplifier 20 of the first signal processing circuit 11.

An output terminal of the operational amplifier is connected to a base terminal of transistor 21 and a collector terminal of the transistor 21 is connected to a base terminal of transistor 22. A collector terminal of the transistor 22 is connected to a negative input terminal of operational amplifier 23 and also connected to the arithmetic circuit 14. Further, a cathode terminal of compressing diode 24 is connected to the collector terminal of the transistor 22 and a cathode terminal of compressing diode 25 is connected to a positive input terminal of the operational amplifier 23. A power supply 26 is connected to an anode terminal of each of these compressing diodes 24 and 25. The power supply 26 is a constant voltage source for supplying a dc voltage $V_{REF}$.

A capacitor 27 for removing the stationary light is externally attached to a CHF terminal of the AFIC 10, whereby this capacitor 27 for removal of stationary light is connected to a base terminal of transistor 28 for removal of stationary light in the first signal processing circuit 11. The capacitor 27 and the operational amplifier 23 are connected to each other through a switch 29 and the CPU 1 controls on/off of this switch 29. A collector terminal of the transistor 28 for removal of stationary light is connected to the negative input terminal of the operational amplifier 20 and an emitter terminal of the transistor 28 is grounded through a resistor 30.

The integrating circuit 15 has the following configuration. The integrating capacitor 6 externally attached to the $C_{INT}$ terminal 33 of the AFIC 10 is connected through a switch 60 to an output terminal of the arithmetic circuit 14 and through a switch 62 to a constant-current source 63. The integrating capacitor 6 is also connected through a switch 65 to an output terminal of an operational amplifier 64 and connected directly to a negative input terminal of the operational amplifier 64. Further, a potential of the integrating capacitor 6 is outputted from the $S_{OUT}$ terminal 34 of the AFIC 10. These switches 60, 62, and 65 are controlled by a control signal from the CPU 1. A second reference voltage supply 66 is connected to a positive input terminal of the operational amplifier 64. The reference voltage supply 66 is a dc power supply which supplies the reference voltage $V_{REF2}$.

The schematic action of this AFIC 10 will be described below referring to FIG. 1 and FIG. 2.

The CPU 1 keeps the switch 29 of the first signal processing circuit 11 on while the IRED 4 emits no light. At this time the stationary light component $I_0$ outputted from the PSD 5 is put into the first signal processing circuit 11, and the current thereof is amplified by the current amplifier composed of the operational amplifier 20 and the transistors 21 and 22. The amplified current is logarithmically compressed by the compressing diode 24 to be converted into a voltage signal, and this voltage signal is put into the negative input terminal of the operational amplifier 23. If a large signal enters the operational amplifier 20, the cathode potential of the compressing diode 24 becomes high and thus the operational amplifier 23 outputs a large signal to charge the capacitor 27 for removal of stationary light. Then base current is supplied to the transistor 28, and thus collector current flows in the transistor 28, so as to lower the signal supplied to the operational amplifier 20 among the signal $I_0$ inputted into the first signal processing circuit 11. In a stable state of the operation of this closed loop, all the signal $I_0$ inputted into the first signal processing circuit 11 flows to the transistor 28 and the capacitor 27 for removal of stationary light stores charge corresponding to the base current at that time.

When the CPU 1 turns the switch 29 off with emission of the IRED 4, the stationary light component $I_0$ out of the signal $I_1+I_0$ outputted from the PSD 5 at this time flows as collector current to the transistor 28 to which the base potential is applied by the charge stored in the capacitor 27 for removal of stationary light. The near-side signal $I_1$ is current-amplified by the current amplifier comprised of the operational amplifier 20 and the transistors 21 and 22 and is logarithmically compressed by the compressing diode 24 into a voltage signal to be outputted. Namely, the first signal processing circuit 11 outputs only the near-side signal $I_1$ after the removal of the stationary light component $I_0$ and the near-side signal $I_1$ is supplied to the arithmetic circuit 14. On the other hand, the second signal processing circuit 12 also outputs only the far-side signal $I_2$ after removal of the stationary light component $I_0$, as the first signal processing circuit 11 did, and the far-side signal $I_2$ is supplied to the arithmetic circuit 14.

The near-side signal $I_1$ outputted from the first signal processing circuit 11 and the far-side signal $I_2$ outputted from the second signal processing circuit 12 are put into the arithmetic circuit 14, and the arithmetic circuit 14 computes and outputs the output ratio $(I_1/(I_1+I_2))$. The output ratio is put into the integrating circuit 15. While the IRED 4 emits the predetermined number of pulses, the switch 60 of the integrating circuit 15 is kept on and the switches 62 and 65 off; therefore, the output ratio signal outputted from the arithmetic circuit 14 is stored in the integrating capacitor 6. After the end of the emission of the predetermined number of pulses, the switch 60 is turned off and the switch 65 is turned on. Thus the charge stored in the integrating capacitor 6 decreases because of charge of an opposite potential supplied from the output terminal of the operational amplifier 64.

The CPU 1 monitors the potential of the integrating capacitor 6 to measure the time necessary for a return to the original potential, obtains the AF signal based on the time, and further computes the distance to the measured object.

Next, the capacitance of the integrating capacitor 6 will be described in detail.

The capacitance of the integrating capacitor 6 is set so that the integrating capacitor 6 is discharged to the maximum when the time necessary for the first integral described hereinafter becomes maximum according to the output ratio signal outputted from the arithmetic circuit 14. For example, the following relation of Eq (1) holds, where the capacitance of the integrating capacitor 6 is C, the voltage that can be utilized during the discharge of the integrating capacitor 6 is $V_{MAX}$, a discharge current value in the first integral is I, and the time necessary for the discharge in the first integral is T.

$$C \cdot V_{MAX} = I \cdot T \quad (1)$$

Let us suppose here that the voltage $V_{MAX}$ that can be utilized for the discharge is 0.97 V, the discharge current value is 7.8 $\mu$A, and the discharge time T is 7800 $\mu$s. Then the capacitance C of the integrating capacitor 6 is about 0.063 $\mu$F. Therefore, a capacitor having the capacitance of 0.068 $\mu$F may be employed as the integrating capacitor 6.

This setting of the capacitance of the integrating capacitor 6 permits secure discharge to be effected without saturation of the integrating capacitor 6 even if the time necessary for the first integral during the distance measurement is maximum. Thus the dischargeable dynamic range of the integrating capacitor 6 can be utilized to the maximum.

Setting of maximum second integral time will be described below.

The maximum second integral time is a time for carrying out the operation of the second integral in the step of distance measurement and is set longer than at least the maximum time when the integral time of the second integral is maximum. A plurality of maximum second integral times are preliminarily set in the. CPU 1. The maximum second integral times are set, for example, based on the time of a first integral step for each pulse emission, the number of pulses in the first integral, and the current in the second integral and are properly changed over depending upon the distance measurement condition.

For example, supposing that the time t1 of a first integral step for each pulse emission is 26 $\mu$s and the number of steps in the first integral is 300, the overall first integral time T1 is 26 $\mu$s×300=7800 $\mu$s. In this case, where the discharge current value I is 7.8 $\mu$A and the capacitance C of the integrating capacitor 6 is 0.068 $\mu$F, a voltage drop Vd of the integrating capacitor 6 due to the discharge in the first integral is 0.8947 V from Vd=(T1.I)/C. When the second integral current I2 is 1.77 $\mu$A, the second integral time T2 in this case is 34.37 ms from T2=(C.Vd)/I2. The maximum second integral time is set to a time not less than this 34.37 ms accordingly.

When the number of steps in the first integral is 150, the overall first integral time T1 is 26 $\mu$s×150=3900 $\mu$s. In this case, the voltage drop Vd of the integrating capacitor 6 due to the discharge in the first integral is 0.4474 V. The second integral time T2 in this case is 17.19 ms. Therefore, the maximum second integral time is set to a time not less than this 17.19 ms.

Further, when the number of steps in the first integral is 100, the overall first integral time T1 is 26 $\mu$s×100=2600 $\mu$s. In this case, the voltage drop Vd of the integrating capacitor 6 due to the discharge in the first integral is 0.2982 V. The second integral time T2 in this case is 11.46 ms. The maximum second integral time is set to a time not less than this 11.46 ms accordingly.

The operation of the distance-measuring apparatus of the present embodiment will be described below.

Figures 3A, 3B, 3C, 3D:
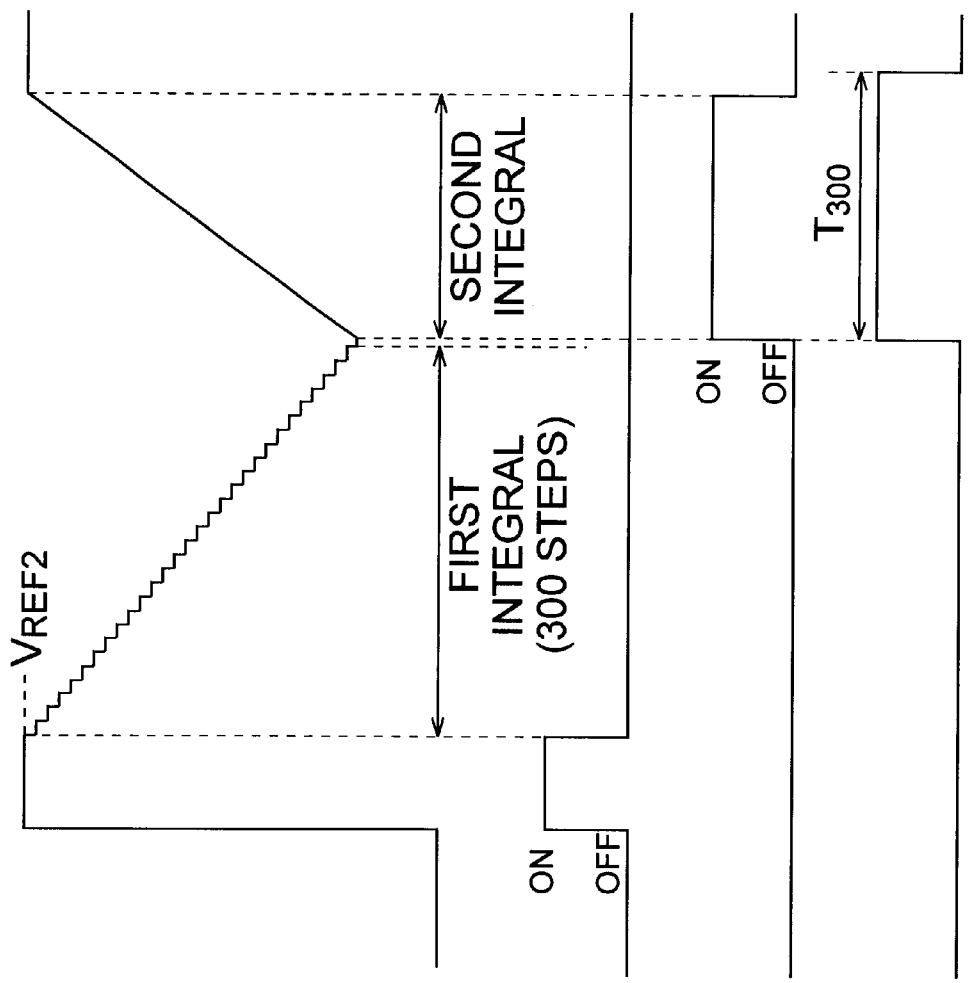
FIG. 3A to FIG. 3D are explanatory diagrams to illustrate the operation of the distance-measuring apparatus according to the present invention.

First described is an example in which the first integral is carried out in a number of steps, depending upon the distance measurement condition such as the luminance, ambient temperature, focal length of the taking lens, or the like; for example, an example in which the first integral is carried out in the number of 300 consecutive steps. The distance measurement conditions stated herein means the condition of luminance, ambient temperature, or focal length. The distance measurement condition may be set based on either one of the luminance, ambient temperature, and focal length, or may be set based on two or more factors selected from them. FIG. 3A to FIG. 3D are timing charts; FIG. 3A shows the charging voltage of the integrating capacitor 6, FIG. 3B the operation of the switch 65, FIG. 3C the operation of the switch 62, and FIG. 3D the maximum second integral time.

When the shutter release button of the camera is depressed by a half stroke to enter the distance-measuring state, the supply of the power-supply voltage is restarted to the AFIC 10 to turn the switch 65 on, whereupon the reference voltage $V_{REF2}$ is applied to the integrating capacitor 6 to charge it. This charge promotes the dielectric polarization of the integrating capacitor 6. The CPU 1 determines the number of steps in the first integral according to the distance measurement condition; for example, 300 steps. The CPU 1 also selects the maximum second integral time $T_{300}$ according to the number of steps in the first integral out of the plurality of preset maximum second integral times. Namely, the CPU 1 functions to select the maximum second integral time in the present embodiment.

After a lapse of a fixed time since the start of the charge of the integrating capacitor 6, the switch 65 is turned off to terminate the charge. Then the driver 3 is actuated by a signal from the CPU 1 to make the IRED 4 emit pulses of infrared light.

The infrared light emitted from the IRED 4 is reflected by the measured object and thereafter received by the PSD 5. On the other hand, at the same time as the emission of the IRED 4, the switch 29 of the first signal processing circuit 11 is turned off to put the near-side signal $I_1$ after the removal of the stationary light component $I_0$ into the arithmetic circuit 14. Similarly, the far-side signal $I_2$ after the removal of the stationary light component $I_0$ is supplied from the second signal processing circuit 12 into the arithmetic circuit 14.

The arithmetic circuit 14 outputs the data of output ratio $I_1/(I_1+I_2)$ based on the near-side signal $I_1$ and far-side signal $I_2$. As soon as this output becomes stable, the switch 60 of the integrating circuit 15 is turned on to put the negative voltage corresponding to the output ratio outputted from the arithmetic circuit 14, into the integrating capacitor 6.

The switch 60 of the integrating circuit 15 is turned off at the same time as off of the IRED 4. After a lapse of a signal error time, the switch 29 of the first signal processing circuit 11 is turned on to start storage of the stationary light component $I_0$ of the output signal outputted from the PSD 5, in the capacitor 27 for removal of stationary light.

The integrating capacitor 6 of the integrating circuit 15 accepts the output ratio or distance information signal outputted from the arithmetic circuit 14 to discharge by a voltage value according to a value of the distance information signal. Namely, as illustrated in FIG. 3A, the distance information signal enters the integrating capacitor 6 every emission of a pulse from the IRED 4 to decrease the voltage of the integrating capacitor 6 stepwise (first integral). A voltage drop amount of each step itself is distance information corresponding to the distance to the measured object, but in the present embodiment the distance information is obtained as the sum of voltage drop amounts obtained by emission of respective pulses from the IRED 4.

After completion of the input by the predetermined number of emissions to the integrating capacitor 6, the switch 60 is kept off and the switch 62 is turned on by a signal from the CPU 1. This causes the integrating capacitor 6 to charge at a constant rate determined by the rating of constant-current source 63 (second integral).

During the period of this second integral the voltage of the integrating capacitor 6 is compared with the reference voltage $V_{REF2}$ and the charging of the integrating capacitor 6 is terminated by turning the switch 62 off with agreement between them. Then the CPU 1 terminates the operation of the second integral after a lapse of the maximum second integral time $T_{300}$ since the start of the second integral, and determines the time required for the second integral. Since the charging rate by the constant-current source 63 is constant, the distance to the measured object can be computed from the time required for the second integral.

When the shutter release button is depressed thereafter by a full stroke, the CPU 1 controls the lens driving circuit 7, based on the distance thus obtained, to move the taking lens 8 to an appropriate in-focus position and then opens the shutter (not illustrated) to effect exposure. With the shutter release operation, the series of photographing operations, including the precharge, distance measurement (first integral and second integral), focusing, and exposure, are carried out in the above-stated manner.

Next described is an example in which the first integral is carried out in the smaller number of steps, depending upon the distance measurement condition such as the luminance, ambient temperature, focal length of the taking lens, or the like; for example, an example in which the first integral is carried out in the number of 150 consecutive steps. FIG. 4A to FIG. 4D are timing charts; FIG. 4A shows the charging voltage of the integrating capacitor 6, FIG. 4B the operation of the switch 65, FIG. 4C the operation of the switch 62, and FIG. 4D the maximum second integral time.

When the shutter release button of the camera is depressed by a half stroke to enter the distance-measuring state, the supply of the power-supply voltage is restarted to the AFIC 10 to turn the switch 65 on in the same manner as in the case described above, whereupon the reference voltage $V_{REF2}$ is applied to the integrating capacitor 6 to charge it. The CPU 1 determines the number of steps in the first integral according to the distance measurement condition; for example, 150 steps. The CPU 1 also selects the maximum second integral time $T_{150}$ according to the number of steps in the first integral out of the plurality of preset maximum second integral times. Therefore, the maximum second integral time $T_{150}$ in this case is shorter than that ($T_{300}$) in the above case wherein the number of steps in the first integral is 300.

The switch 65 is turned off to terminate the charge. Then the driver 3 is actuated by a signal from the CPU 1 to make the IRED 4 emit pulses of infrared light. The infrared light emitted from the IRED 4 is reflected by the measured object and thereafter received by the PSD 5. On the other hand, at the same time as the emission of the IRED 4, the switch 29 of the first signal processing circuit 11 is turned off to put the near-side signal $I_1$ after the removal of the stationary light component $I_0$ into the arithmetic circuit 14. Similarly, the far-side signal $I_2$ after the removal of the stationary light component $I_0$ is supplied from the second signal processing circuit 12 into the arithmetic circuit 14.

The arithmetic circuit 14 outputs the data of output ratio $I_1/(I_1+I_2)$ based on the near-side signal $I_1$ and far-side signal $I_2$. As soon as this output becomes stable, the switch 60 of the integrating circuit 15 is turned on to put the negative voltage corresponding to the output ratio outputted from the arithmetic circuit 14, into the integrating capacitor 6.

The switch 60 of the integrating circuit 15 is turned off at the same time as off of the IRED 4. After a lapse of the signal error time, the switch 29 of the first signal processing circuit 11 is turned on to start storage of the stationary light component $I_0$ of the output signal outputted from the PSD 5, in the capacitor 27 for removal of stationary light.

The integrating capacitor 6 of the integrating circuit 15 accepts the output ratio or distance information signal outputted from the arithmetic circuit 14 to discharge by a voltage value according to a value of the distance information signal. Namely, as illustrated in FIG. 4A, the distance information signal enters the integrating capacitor 6 every emission of a pulse from the IRED 4 to decrease the voltage of the integrating capacitor 6 stepwise (first integral). A voltage drop amount of each step itself is distance information corresponding to the distance to the measured object, but in the present embodiment the distance information is obtained as the sum of voltage drop amounts obtained by emission of respective pulses from the IRED 4.

After completion of the input by the predetermined number of emissions to the integrating capacitor 6, the switch 60 is kept off and the switch 62 is turned on by a signal from the CPU 1. This causes the integrating capacitor 6 to charge at the constant rate determined by the rating of the constant-current source 63 (second integral).

During the period of this second integral the voltage of the integrating capacitor 6 is compared with the reference voltage $V_{REF2}$ and the charging of the integrating capacitor 6 is terminated by turning the switch 62 off with agreement between them. Then the CPU 1 terminates the operation of the second integral after a lapse of the maximum second integral time $T_{150}$ since the start of the second integral, and determines the time required for the second integral. Since the charging rate by the constant-current source 63 is constant, the distance to the measured object can be computed from the time required for the second integral.

When the shutter release button is depressed thereafter by a full stroke, the CPU 1 controls the lens driving circuit 7, based on the distance thus obtained, to move the taking lens 8 to an appropriate in-focus position and then opens the shutter (not illustrated) to effect exposure. With the shutter release operation, the series of photographing operations, including the precharge, distance measurement (first integral and second integral), focusing, and exposure, are carried out in the above-stated manner.

As described above, the distance-measuring apparatus 100 of the present embodiment is arranged to properly set the maximum second integral time according to the distance measurement condition. Therefore, the next operation can be carried out immediately after completion of the second integral, so that the distance measurement time can be decreased. The time parallax is decreased between the start of the shutter release operation and the end of exposure accordingly. For example, where the distance measurement is carried out with execution of 150 steps of the first integral, the maximum second integral time $T_{150}$ is selected accordingly thereto, and thus the next operation can be carried out without waiting for a lapse of the maximum second integral time $T_{300}$ longer than the maximum second integral time $T_{150}$. Therefore, the distance measurement time can be reduced.

Figure 4E:
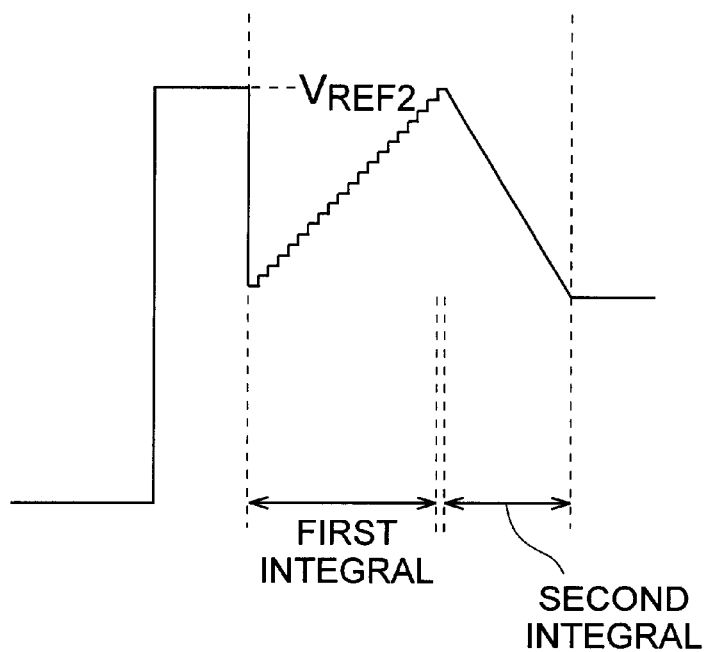
FIG. 4E is an explanatory diagram to illustrate the operation of a modification of the distance-measuring apparatus according to the present invention.

It is noted that the present invention is by no means limited to the above embodiment but can involve various modifications and changes. For example, the present invention can also be applied to cases in which the charge and discharge of the integrating circuit are reverse to those in the above embodiment, as illustrated in FIG. 4E, i.e., to the integrating circuits in which the integrating capacitor is charged in several steps so as to increase the voltage stepwise in the first integral and thereafter the integrating capacitor is discharged in only one step in the second integral.

The present embodiment was detailed in the configuration in which in the distance measurement step the distance to the measured object was measured by carrying out the second integral once after the first integral, but the distance-measuring apparatus according to the present invention is not limited to this configuration. For example, the apparatus may also be arranged to carry out a plurality of consecutive distance measurement operations by repeating the step of carrying out the second integral after the first integral plural times. In this case, it can be contemplated that the number of emissions in the first integral in the first operation is made different from that in the second operation and thereafter and that the maximum second integral time set in the first operation is made properly different from that in the second operation and thereafter. This permits the next operation to be carried out quickly after completion of each second integral, whereby the distance measurement time can be reduced.

As described above, according to the present invention, the maximum second integral time is properly set according to the distance measurement condition and the next operation is carried out after a lapse of the maximum second integral time. This permits the next operation to be carried out soon after completion of the second integral, thus decreasing the distance measurement time. Therefore, the time parallax can be reduced between the start of the shutter release operation and the end of exposure.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance-measuring apparatus comprising:

a light projecting means for projecting pulses of light toward an object at a distance to be measured;

light receiving means for receiving light of the light projected and reflected from the object, at a photoreceptive position on a position sensing device according to the distance to the object and outputting a signal according to the photoreceptive position;

arithmetic means for carrying out an arithmetic operation based on the signal outputted from said light receiving means and outputting an output ratio signal according to the distance to the object;

integrating means comprising an integrating capacitor, said integrating means carrying out a first integration in which the signal outputted from said arithmetic means is integrated by discharging/charging said integrating capacitor and thereafter carrying out a second integration by charging/discharging said integrating capacitor with a constant current, said integrating means comparing a voltage of said integrating capacitor with a reference voltage during the second integration and outputting a comparison result signal according to the comparison;

maximum second integration time selecting means for selecting one of a plurality of maximum second integration times, each second integration time being set as a process time of the second integration, according to a distance measurement condition; and detecting means for detecting the distance to the object, based on the signal outputted from said integrating means, after a lapse of the maximum second integration time selected.

2. The distance-measuring apparatus according to claim 1, wherein the maximum second integration time selecting means selects the maximum second integration distance measurement condition selected from the group consisting of luminance, ambient temperature, and focal length.

3. The distance-measuring apparatus according to claim 1, for focusing a lens.

4. The distance-measuring apparatus according to claim 1, wherein said light projecting means is an infrared-emitting diode.

5. The distance-measuring apparatus according to claim 1, wherein said light receiving means outputs a near-side signal which increases with a decrease in the distance to the object and a far-side signal which increases with an increase in the distance to the object.

6. The distance-measuring apparatus according to claim 5, wherein said arithmetic means outputs the output ratio signal based on a ratio of the near-side signal and the far-side signal.

7. The distance-measuring apparatus according to claim 1, wherein said arithmetic means and said integrating means are included in a single autofocusing integrated circuit (IC).

* * * * *